(12) United States Patent  (10) Patent No.: US 9,074,940 B2
Hsu  (45) Date of Patent: Jul. 7, 2015

(54) MINIATURE LIGHT SENSING ASSEMBLY

(71) Applicant: AsenseTek Inc., New Taipei (TW)

(72) Inventor: Bill Hsu, New Taipei (TW)

(73) Assignee: AsenseTek Inc., New Taipei (TW)

( * ) Notice: Subject to any disclaimer, the term of this patent is extended or adjusted under 35 U.S.C. 154(b) by 0 days.

(21) Appl. No.: 14/166,282

(22) Filed: Jan. 28, 2014

(65) Prior Publication Data

US 2015/0036139 A1    Feb. 5, 2015

(30) Foreign Application Priority Data

Aug. 2, 2013 (TW) .............................. 102214581 U

(51) Int. Cl.
G01J 3/46 (2006.01)
G01J 3/50 (2006.01)
H04L 29/10 (2006.01)
G06F 1/16 (2006.01)
H04M 1/725 (2006.01)
G01J 1/02 (2006.01)

(52) U.S. Cl.
CPC . *G01J 3/50* (2013.01); *H04L 29/10* (2013.01); *G06F 1/1632* (2013.01); *H04M 1/72527* (2013.01); *G01J 1/0271* (2013.01)

(58) Field of Classification Search
USPC .................................. 356/402–425, 300–334
See application file for complete search history.

(56) References Cited

U.S. PATENT DOCUMENTS

2014/0131578 A1* 5/2014 Hruska et al. ............ 250/339.02

* cited by examiner

*Primary Examiner* — Abdullahi Nur
(74) *Attorney, Agent, or Firm* — WPAT, P.C.; Anthony King

(57) ABSTRACT

The present invention provides a miniature light sensing assembly comprising a light sensing device, a computing device and a connecting member. The light sensing device comprises a main body having an entrance, a light detecting unit disposed in the main body and receiving light travelling through the entrance, a processing module disposed in the main body and converting the light into a photoelectric signal, a connecting unit disposed on the main body, and a signal transmitting module transmitting the photoelectric signal wirelessly. The connecting member is adapted to couple with the light sensing device through the connecting unit. The photoelectric signal is transmitted from the signal transmitting module to the computing device wirelessly and converted into information required by a user by the computing device.

12 Claims, 14 Drawing Sheets

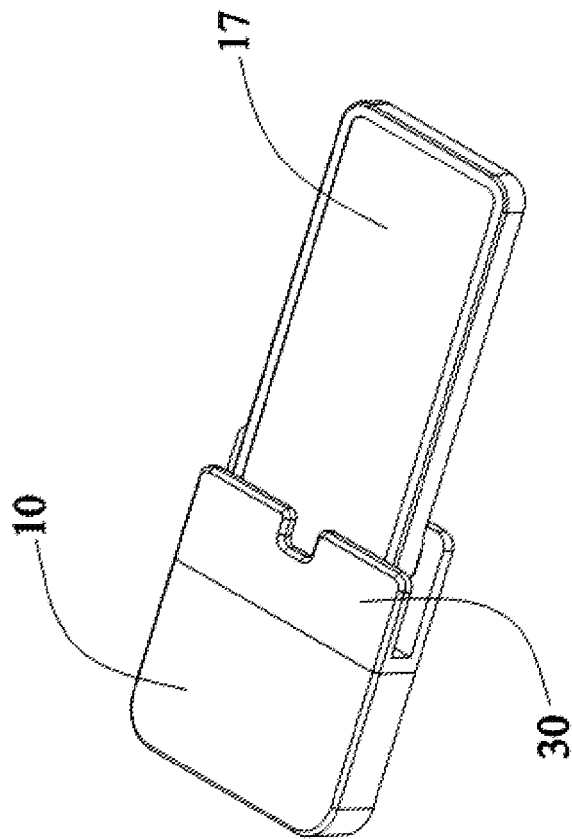
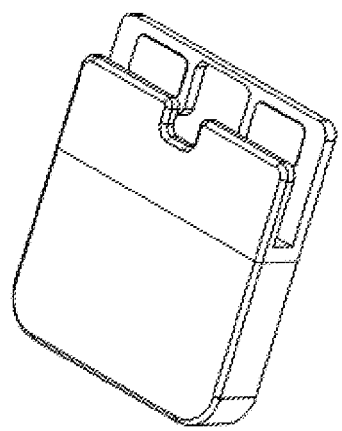
Figure 5

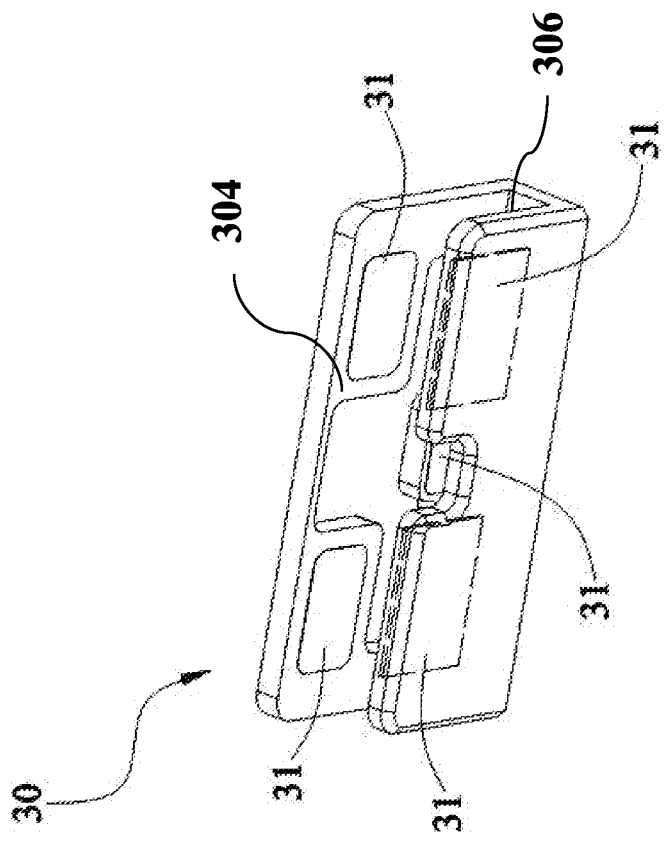
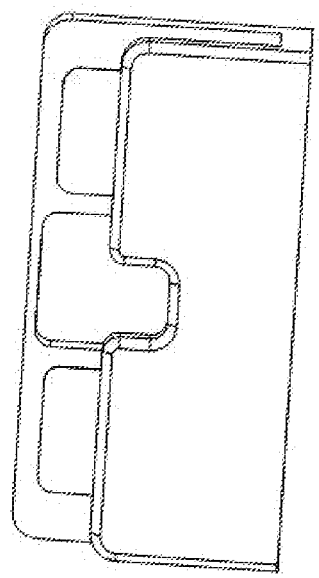
Figure 6

MINIATURE LIGHT SENSING ASSEMBLY

FIELD OF THE INVENTION

The present invention pertains to a miniature light sensing device and an assembly thereof, particularly one transmitting signals wirelessly and adaptable to various computing devices.

BACKGROUND OF THE INVENTION

Light sensing devices are widely applied to fields of such as inspection equipment for manufacture process, environment monitoring system, color detection management, biomedical measurement and spectrum analysis. A light sensing device has a light sensing unit detecting light from environment and converting the received light into an electronic signal. The electronic signal is processed to obtain required information for a user. However, although the conventional light sensing device is often designed for measurement in various environments, a computing equipment is necessary for analysis and computation of the electronic signals generated by the light sensing device. The additional computing equipment and cable for the computing equipment may cause inconvenience for the user.

BRIEF SUMMARY OF THE INVENTION

An object of the present invention is to provide a solution to allow convenient coupling of a light sensing device to an electronic device which is used in our daily life and capable of computing and processing electronic signals, such as a laptop, a mobile phone or a personal computer.

Accordingly, the present invention features a miniature light sensing assembly comprising a light sensing device, a computing device, and a connecting member. The light sensing device comprises a main body having an entrance, a light detecting unit disposed in the main body and receiving light travelling through the entrance, a processing module disposed in the main body and converting the light into a photoelectric signal, a connecting unit disposed on the main body, and a signal transmitting module transmitting the photoelectric signal wirelessly. The connecting member is adapted to couple with the light sensing device through the connecting unit. The photoelectric signal is transmitted from the signal transmitting module to the computing device wirelessly and converted into information required by a user by the computing device. The computing device is configured to, upon execution of machine readable instructions: sending an instruction on exposure time to the light sensing device, receiving the photoelectric signal by pixel transmitted by the signal transmitting module, converting the photoelectric signal by pixel into an electric signal by wavelength, calculating spectrum-related or photometric-related information based on the electric signal by wavelength, and displaying the spectrum-related or photometric-related information.

According to the present invention, the spectrum-related or photometric-related information includes but is not limited to light color-associated information.

The present invention also features the computing device being one of a desktop computer, a non-portable computer, a laptop computer, a smart phone, smart glasses, a smart wrist strap device, tablet computer or other portable computing devices.

The present invention also features the connecting member being one of a portable seat, an adjustable holder or an accommodating case.

The present invention also features the computing device being a laptop or a desktop computer, and the connecting member is a portable seat comprising a seat main body having a top surface and a bottom surface, a first securing unit disposed on the top surface and a rotatable unit disposed on the bottom surface, wherein by connection of the first securing unit to the connecting unit, the portable seat is joined to the light sensing device, and the rotatable unit may be rotated by an appropriate angle for firm standing of the light sensing device on a flat surface.

This invention further features that the rotatable unit is joined to the main body by a bolt and a shaft with respect to which the rotatable unit rotates, and a spring is disposed between the bolt and the shaft to bias the rotatable unit so that the rotatable unit is tightly joined to the main body.

This invention further features that the computing device is a tablet or a smart phone, and the connecting member is an adjustable holder comprising a holder main body having a reverse U-shaped cross section and a second securing unit disposed on the top of the adjustable holder, wherein the holder main body has a first inner wall and a second inner wall with the distance therebetween being equal to or slightly smaller than the thickness of the computing device so that the adjustable holder with the light sensing device joined thereto through the second securing unit may be clamped on the computing device.

This invention also features that a plurality of soft pads are disposed on the first inner wall and the second inner wall, and the distance between the soft pads on the first inner wall and the second inner wall is equal to or smaller than the thickness of the computing device so that the adjustable holder may be firmly clamped on the computing device.

This invention also features that the first inner wall is longer than the second inner wall, and the adjustable holder may be clamped on the computing device with the second inner wall facing the display side of the computing device.

This invention also features that the computing device is a smart phone and the connecting member is an accommodating case having a recess accommodating the computing device and a third securing unit disposed on an outer surface of the accommodating case through which the light sensing device may be joined to, wherein the recess has a shape corresponding to the shape of the computing device for accommodating the same.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown.

In the drawings:

FIG. 5 is a perspective view of another embodiment of a miniature light sensing assembly of the invention.

FIG. 6 is a perspective view of an adjustable holder of the invention.

DETAILED DESCRIPTION OF THE INVENTION

The light sensing device of the invention converts the light into a photoelectric signal. The photoelectric signal is transmitted to a computing device by a signal transmitting module wirelessly so that the conventional cable connection is not required.

The present invention provides several connecting members adapted to various computing devices.

Figure 1:
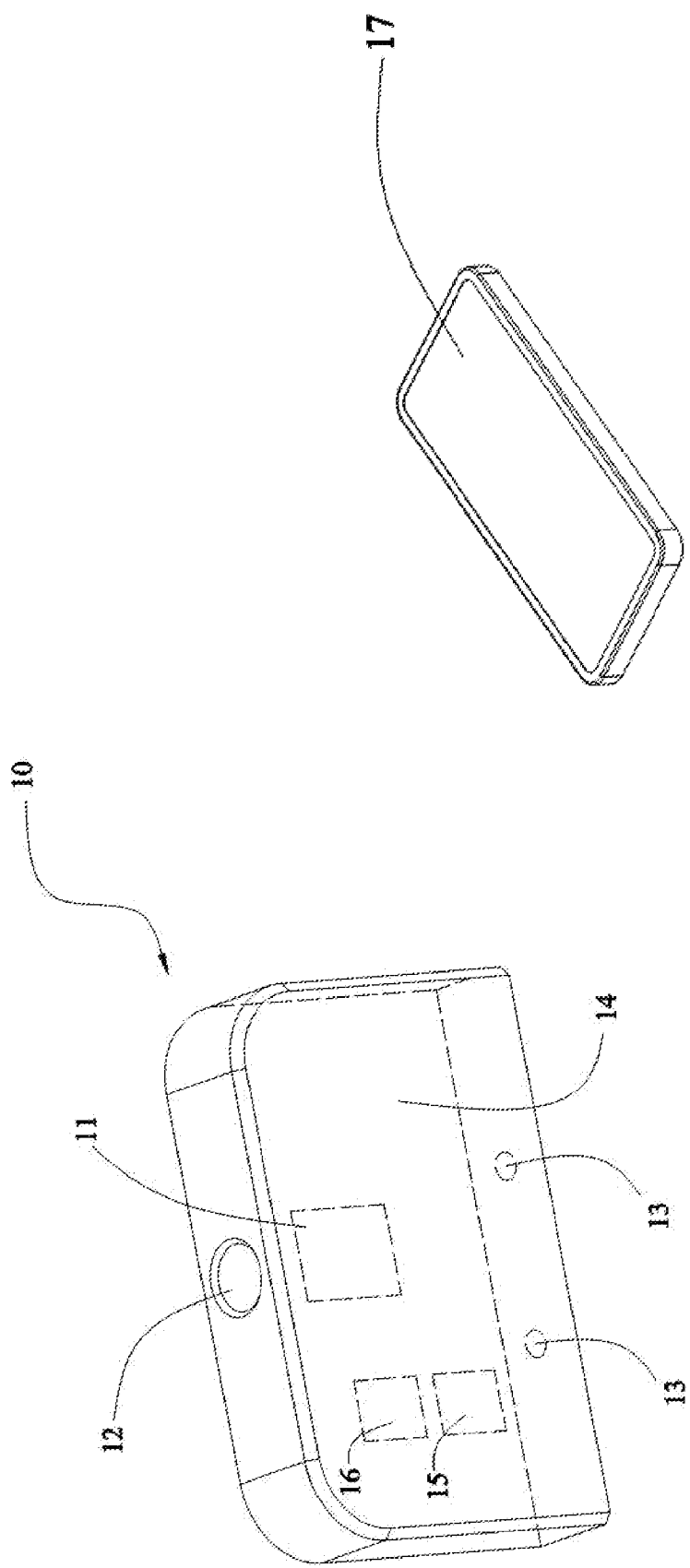
FIG. 1 is a perspective view of a miniature light sensing device of the invention.

Referring to FIG. 1, a miniature light sensing device 10 comprises a main body 14, a light sensing unit 11, a processing module 15, a connecting unit 13 and a signal transmitting module 16. The light detecting unit 11 disposed in the main body 14 receives light via an entrance 12 formed on an outer surface of the main body 14. The received light is converted into a photoelectric signal by the processing module 15.

The connecting unit 13 is disposed on the outer surface of the main body 14 for connection of the miniature light sensing device 10 to a connecting member. Preferably, the connection is performed by engagement. Other suitable connection structures are also applicable.

The photoelectric signal from the processing module 15 is transmitted wirelessly to a computing device 17. The computing device 17 converts the photoelectric signal into information required by a user. The photoelectric signal may be transmitted by Bluetooth or RFID. In this embodiment, the photoelectric signal is transmitted by Bluetooth. The computing device 17 is one or more of a desktop computer, a non-portable computer, a laptop, a smart phone, smart glasses, a smart wrist strap device, tablet computer or other portable computing devices.

The miniature light sensing assembly of the present invention further comprises a connecting member. The connecting member is selected from the group consisting of a portable seat, an adjustable holder, and an accommodating case. The connecting member may be chosen according to different types of computing devices.

In the light sensing device 10, the light sensing unit 11 receives light travelling through an entrance 12 according to the instruction on exposure time set by a user and provided by the computing device 17, and converted the received light signal to an analog electric signal. The analog signal is then converted by the processing module 15 to a digital photoelectric signal by pixel for transmitting to the computing device 17 for further analysis.

Figure 10:
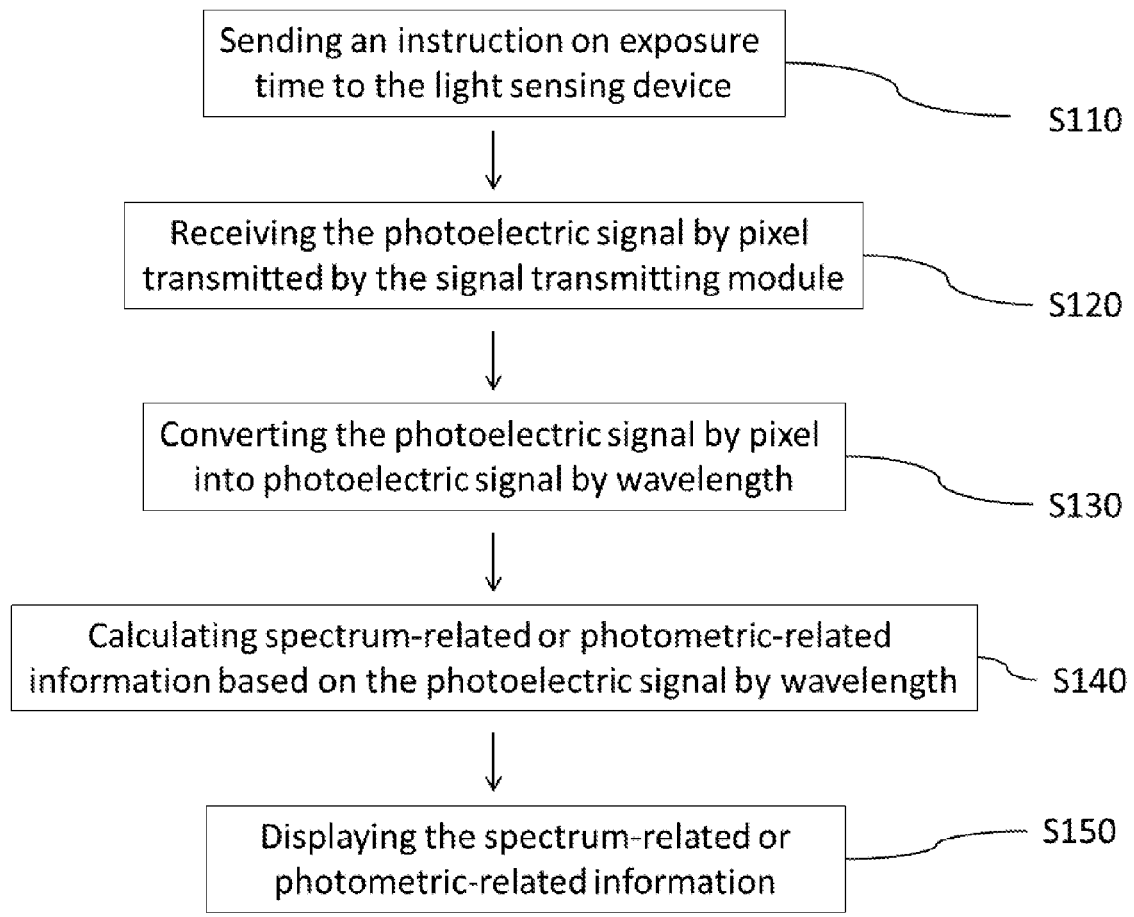
FIG. 10 is a flow diagram of a method performed by the computing device of a miniature light sensing assembly of the present invention.

Referring to FIG. 10, the computing device 17 is configured to, upon execution of machine readable instructions, preform the following steps: sending an instruction on exposure time to the light sensing device (step S110), receiving the photoelectric signal by pixel transmitted by the signal transmitting module (step S120), converting the photoelectric signal by pixel into an electric signal by wavelength (step S130), calculating spectrum-related or photometric-related information based on the electric signal by wavelength (step S140), and displaying the spectrum-related or photometric-related information (step S150).

Figure 11:
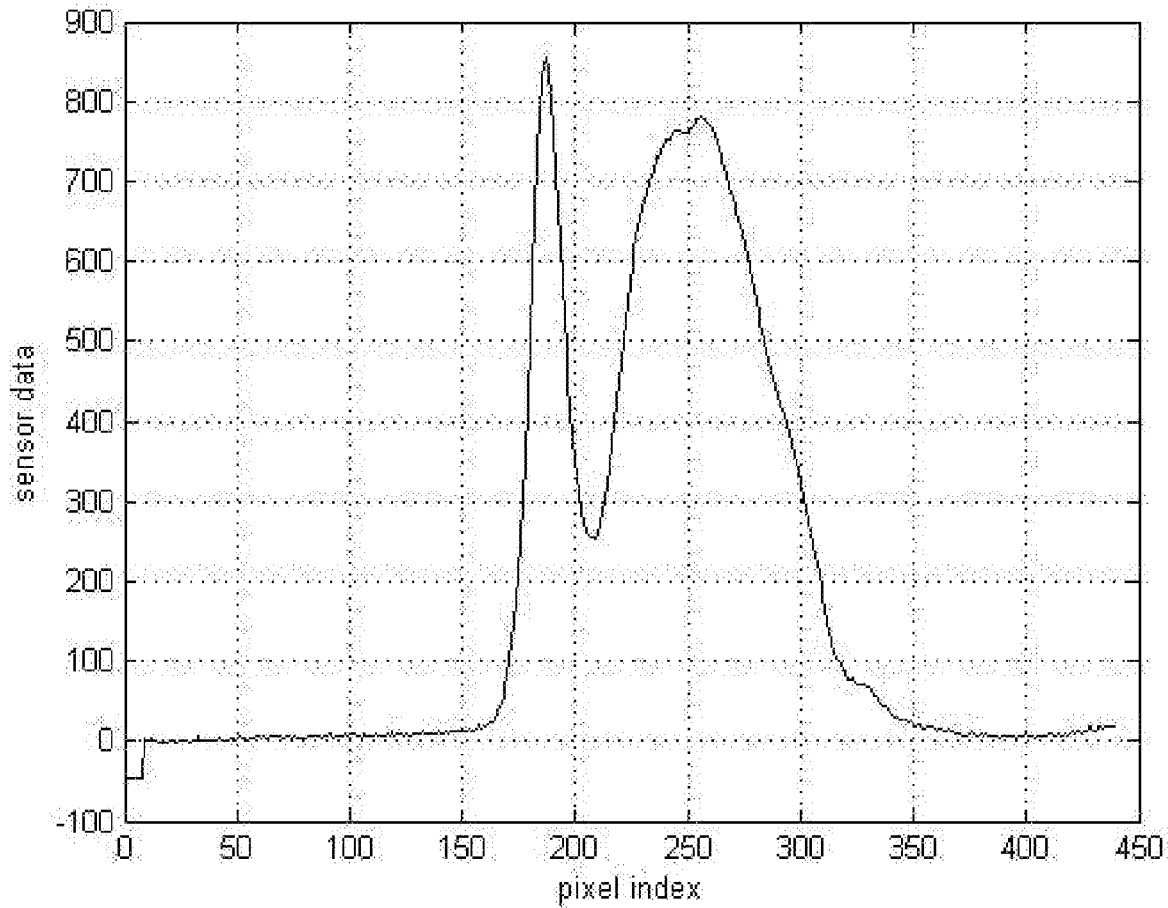
FIG. 11 shows the photoelectric signal by pixel from a cool white LED.
Figure 12:
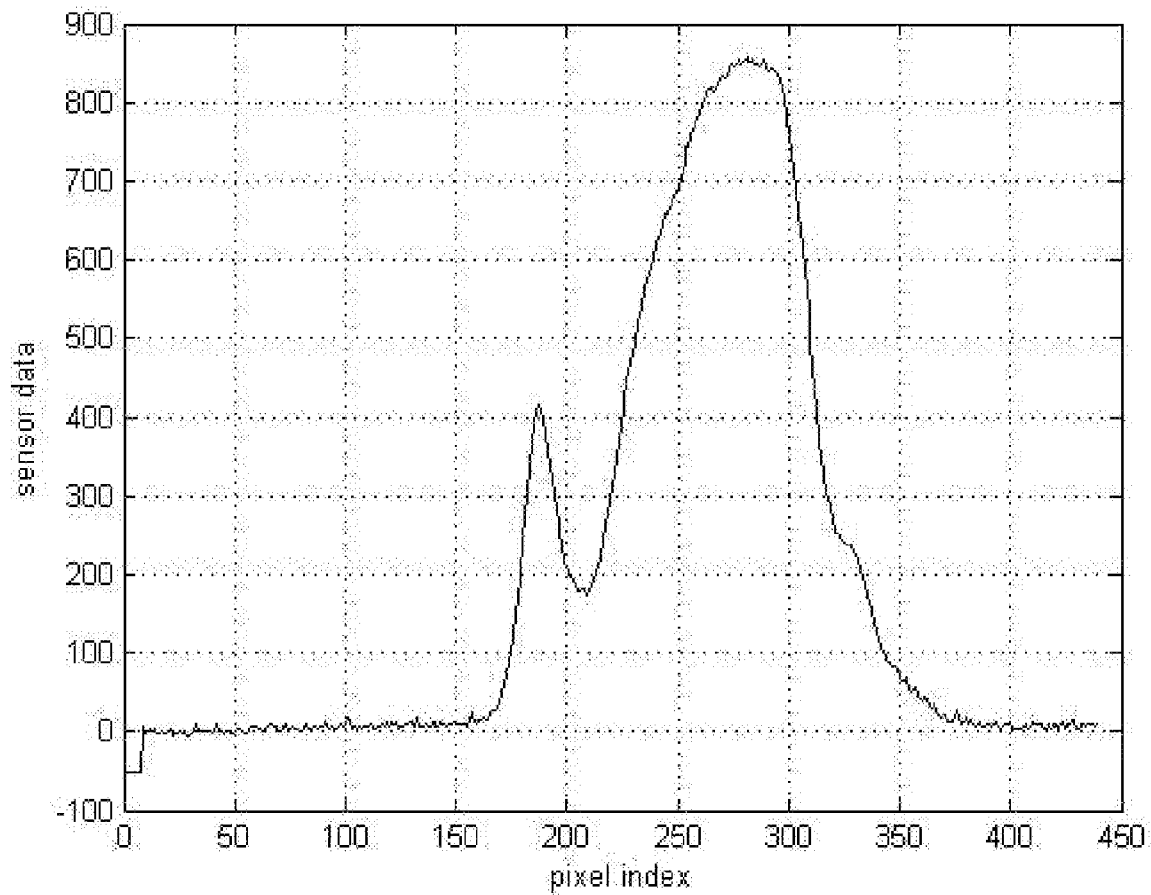
FIG. 12 shows the photoelectric signal by pixel from a warm white LED.
Figure 13:
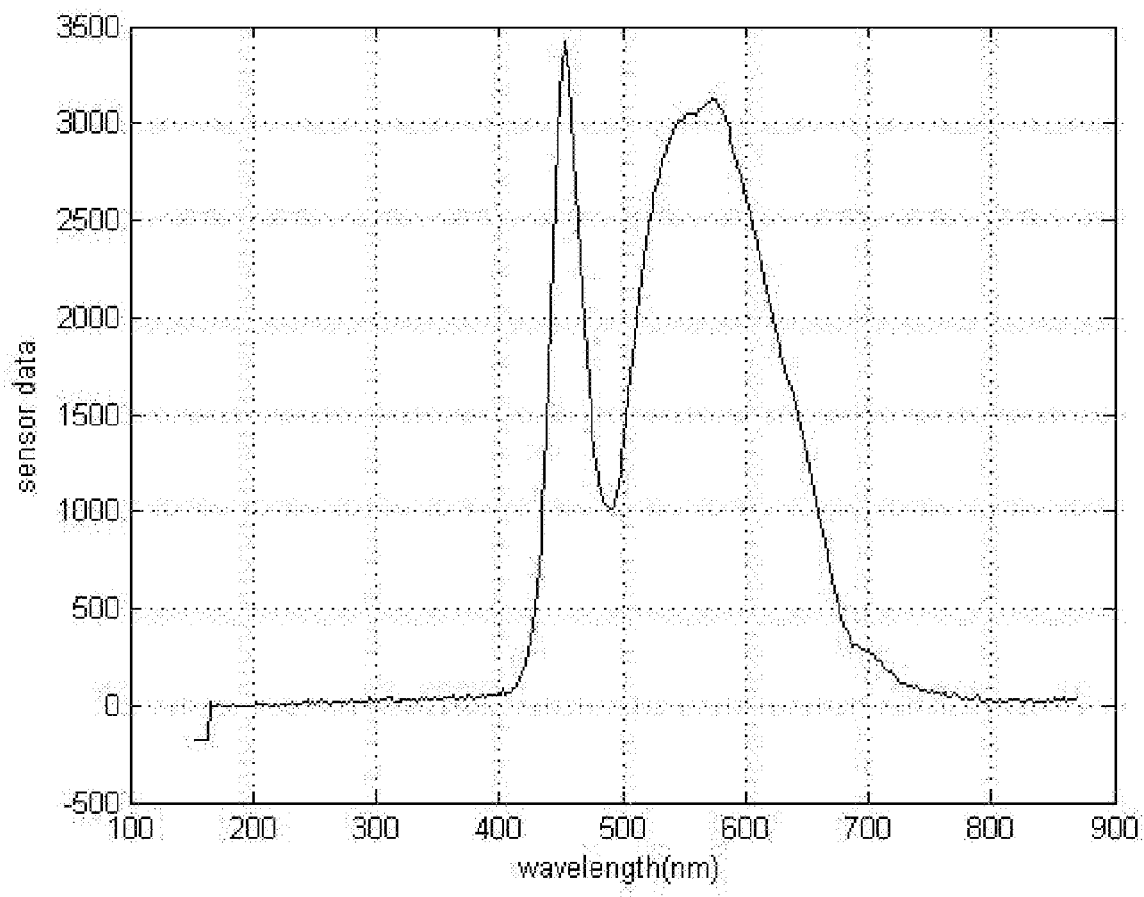
FIG. 13 shows the electric signal by wavelength converted from the photoelectric signal by pixel of said cool white LED.
Figure 14:
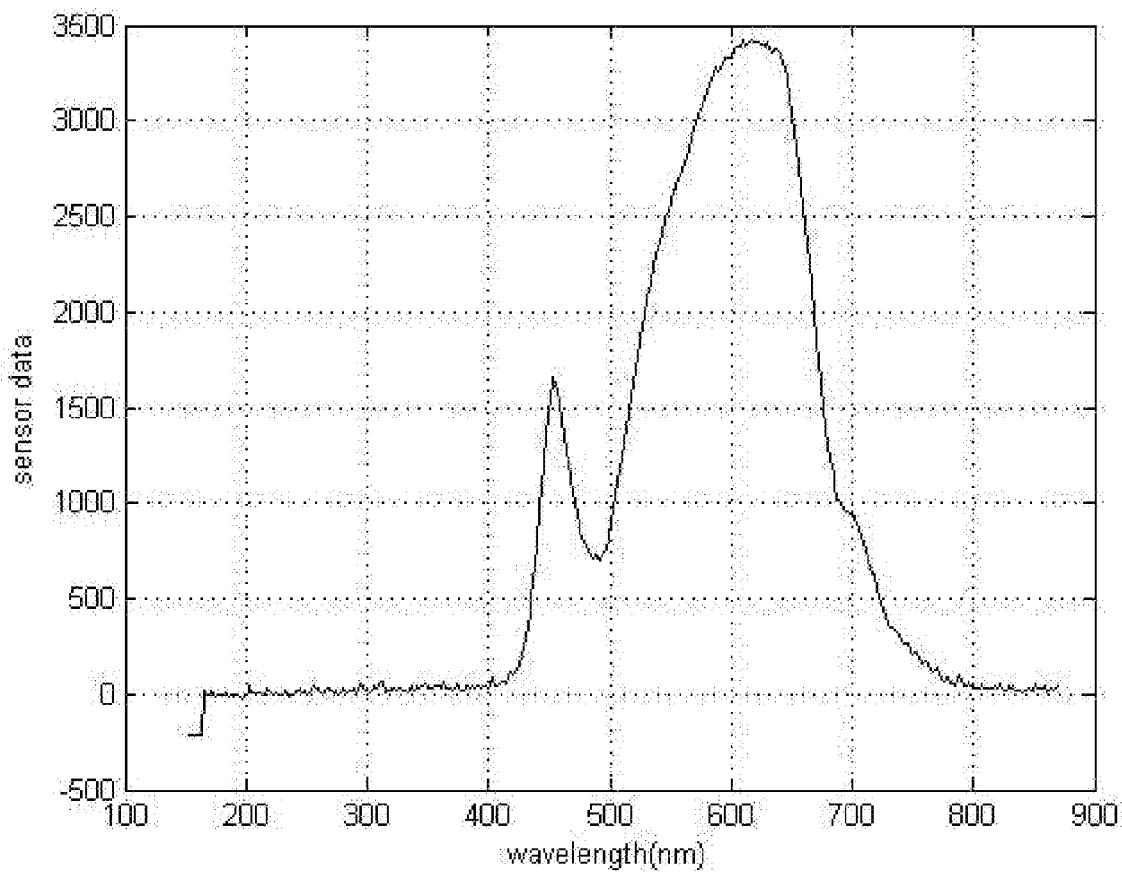
FIG. 14 shows the electric signal by wavelength converted from the photoelectric signal by pixel of said warm white LED.

FIG. 11 shows the photoelectric signal by pixel from a cool white LED, and FIG. 12 shows the photoelectric signal by pixel from a warm white LED. FIG. 13 shows the electric signal by wavelength converted from the photoelectric signal by pixel of said cool white LED, and FIG. 14 shows the photoelectric signal by wavelength converted from the electric signal by pixel of said warm white LED.

The spectrum-related or photometric-related information includes but is not limited to light color-associated information, such as color coordinate, color temperature or color rendering. The spectrum-related or photometric-related information may be calculated based on the electric signal by wavelength according to well-established methods in the art.

Figure 2:
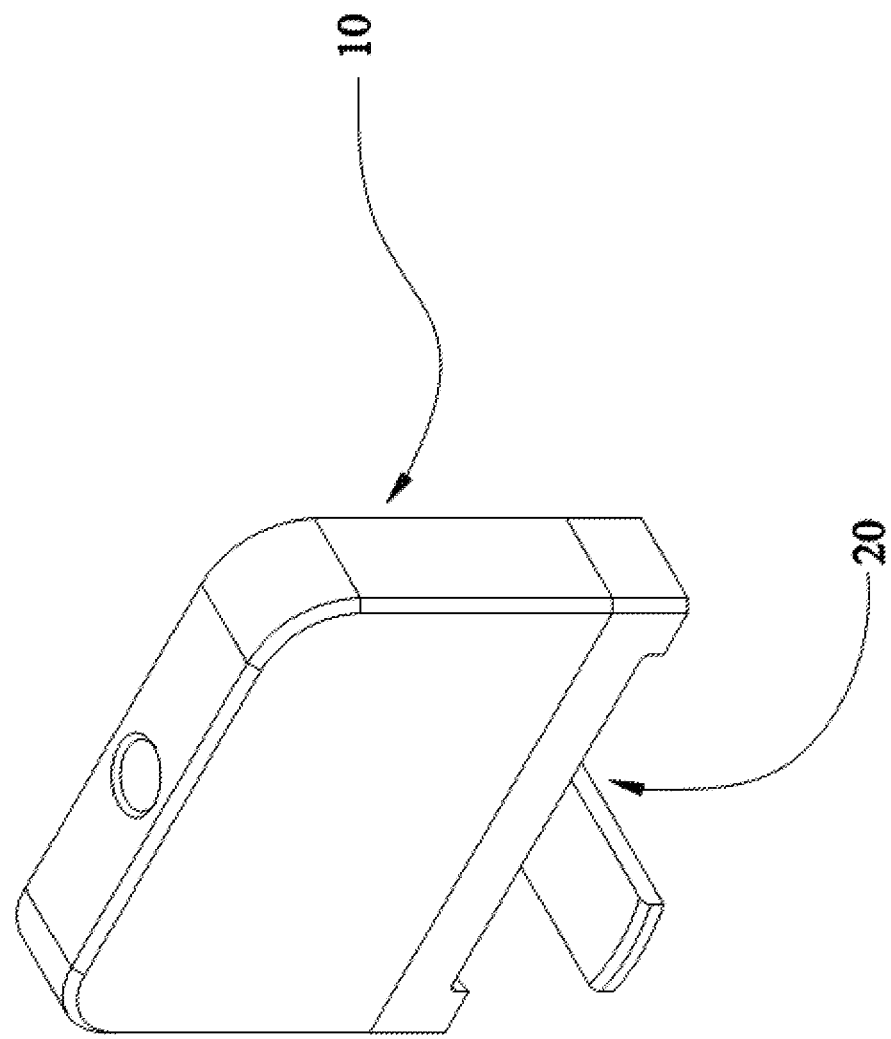
FIG. 2 is a perspective view of an embodiment of a miniature light sensing assembly of the invention.
Figure 3:
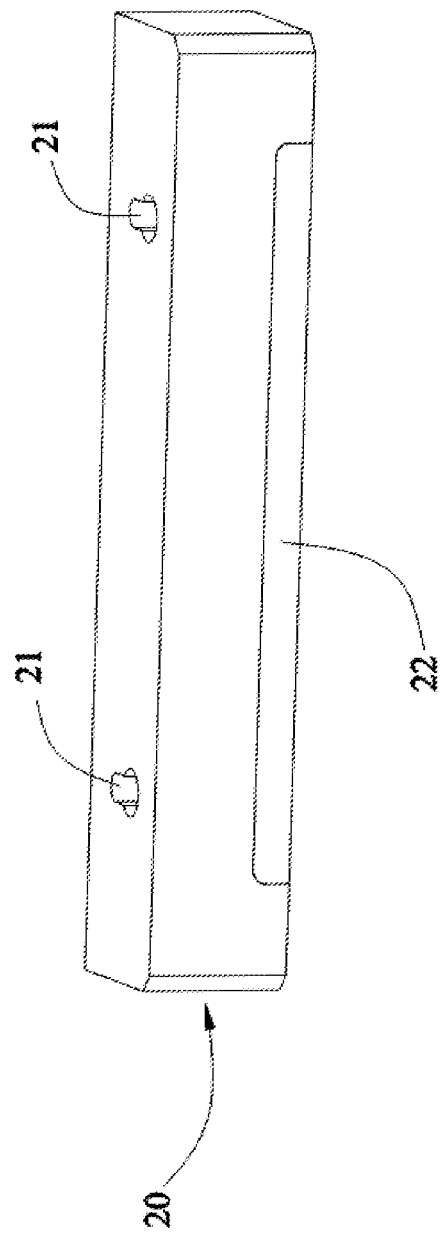
FIG. 3 is a perspective view of a portable seat of the invention.
Figure 4:
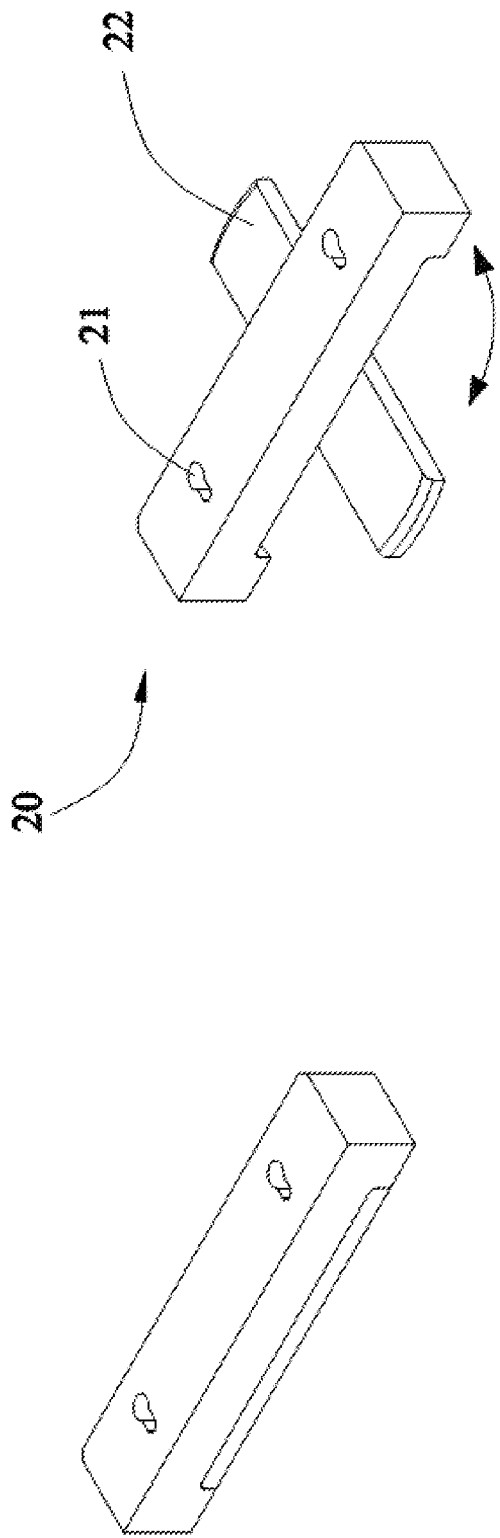
FIG. 4 depicts the rotation of a rotational unit of the portable seat of FIG. 3.
Figure 7:
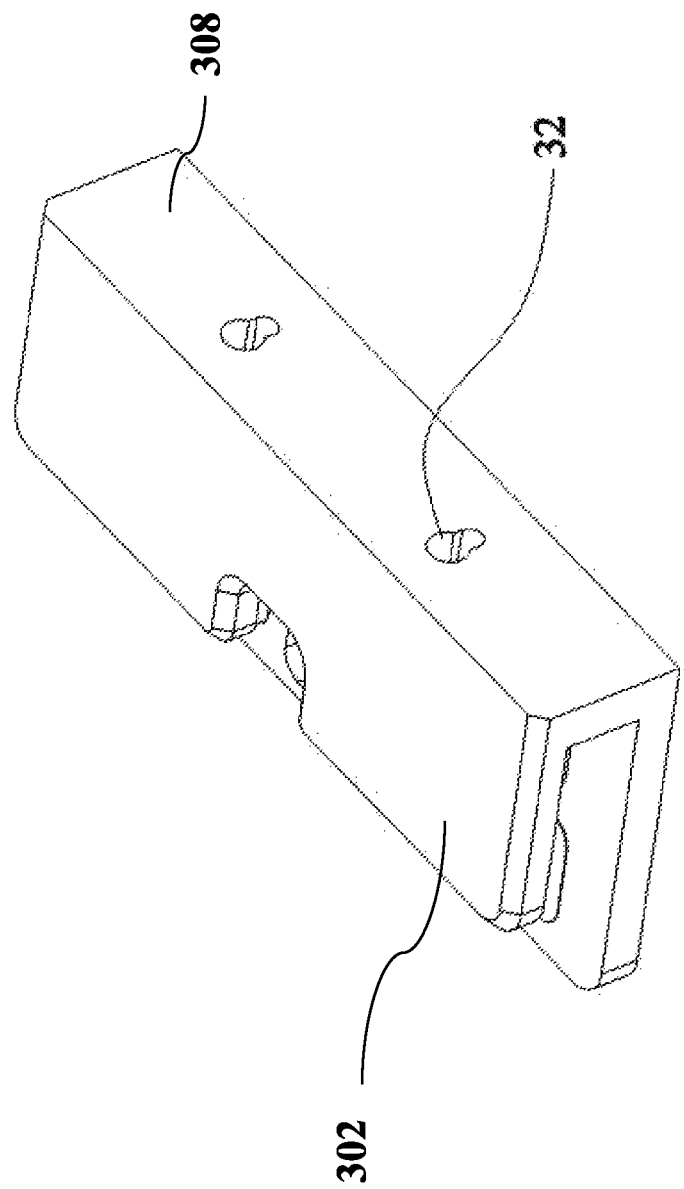
FIG. 7 is a perspective view of an adjustable holder of the invention.

Referring to FIGS. 2 to 4, when the computing device 17 is a laptop, a desktop or other non-portable device, the connecting member can be a portable seat 20 including a seat main body, a first securing unit 21 and a rotatable unit 22. The seat main body has a top surface on which the first securing unit 21 is disposed and a bottom surface on which the rotatable unit 22 is disposed. The portable seat 20 may be connected to the connecting unit 13 of the light sensing device 10 through the first securing unit 21. The connection is preferably performed by an engagement structure, but is not limited thereto. The rotatable unit 22 is joined to the seat main body by a bolt and a shaft. The rotatable unit 22 may be rotated by an appropriate angle, e.g. to a position perpendicular to the seat main body, with respect to the shaft to increase the stability of the light sensing device 10 and the portable seat 20 when they are set up on a flat surface, such as a desktop. A spring is disposed between the bolt and the shaft. The spring biases the rotatable unit 22 so that the rotatable unit 22 is tightly joined to the seat main body. The portable seat 20 is preferably for placing on a flat surface such as a table surface for measurement with the light sensing device 10 joined thereto.

Referring to FIGS. 1 and 5-7, when the computing device 17 is a tablet or a smart phone, the connecting member can be an adjustable holder 30 comprising a holder main body 302 having an approximately reverse U-shaped cross section and a second securing unit 32. The holder main body has a first inner wall 304 and a second inner wall 306, with the distance therebetween being equal to or slightly smaller than the thickness of the computing device so that the adjustable holder with the light sensing device joined thereto through the second securing unit may be clamped on the computing device. A plurality of soft pads 31 may be further disposed on the first and second inner walls 304 and 306. The distance between the soft pads 31 on the first inner wall 304 and the second inner wall 306 is equal to or smaller than the thickness of the computing device 17. When the computing device 17 is inserted into the adjustable holder 30, the soft pads 31 and the first and second inner walls provides friction force to position the computing device 17 in a groove structure formed by the holder main body. The distance between the first and second inner walls 304 and 306 may be adjusted according to the thickness of various tablet or smart phone. Preferably, the first inner wall 304 is longer than the second inner wall 306, and the adjustable holder 30 may be clamped on the computing device 17 with the second inner wall facing the display side of the computing device 17. In this way, the first inner wall supports the computing device 17 to increase the clamping stability between the computing device 17 and the adjustable holder 30. The second securing unit 32 is disposed on a top side 308 of the adjustable holder 30, adapted to couple with the connecting unit 13 of the light sensing device 10. The coupling is preferably performed by an engagement structure, but is not limited thereto. When the computing device 17 is inserted into the adjustable holder 30, a user may hold the computing device 17 and aim the light sensing device 10 connected thereto through the adjustable holder 30 at an object to be measured.

Figure 8:
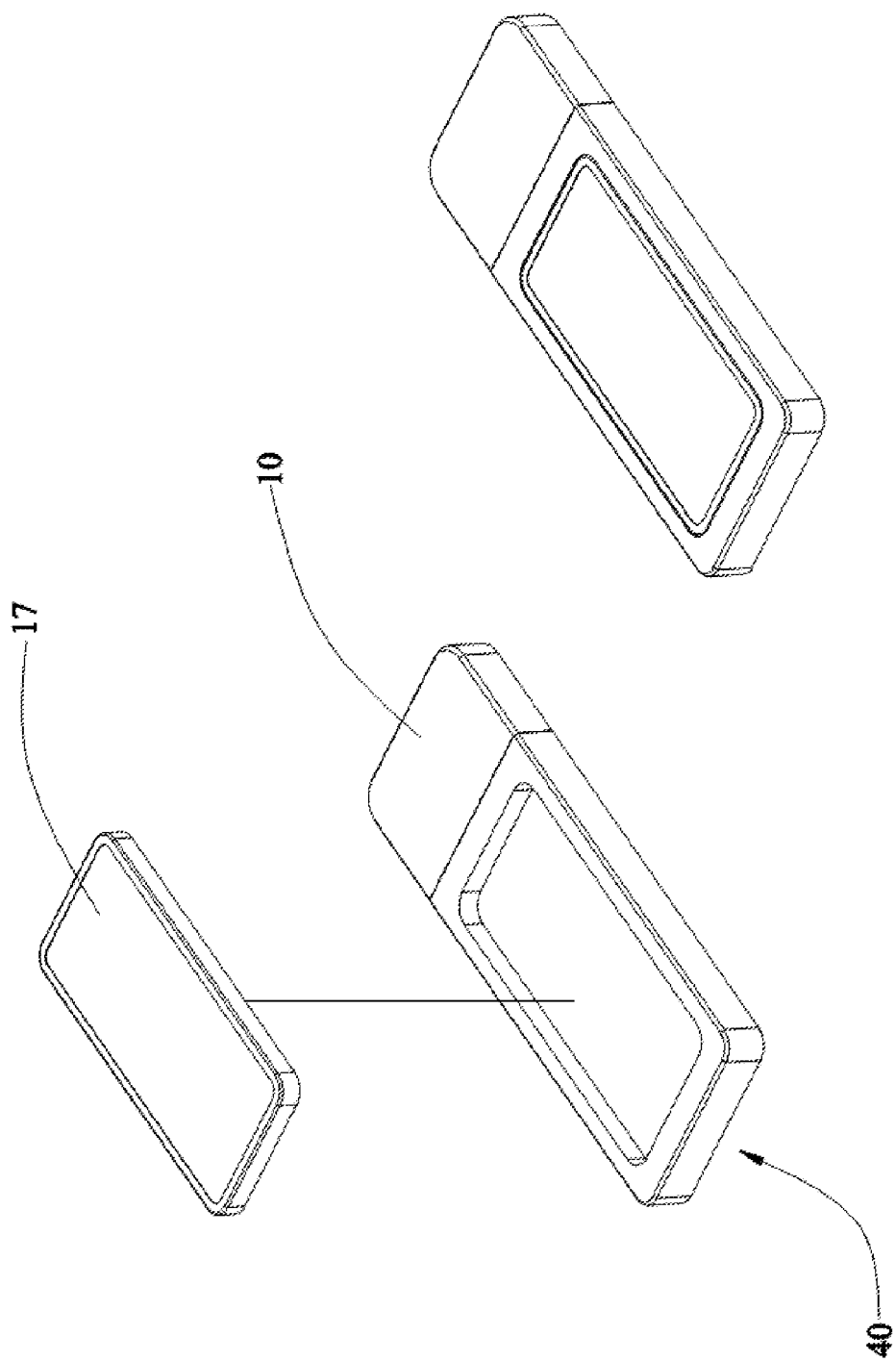
FIG. 8 is a perspective view of another embodiment of a miniature light sensing assembly of the invention.
Figure 9:
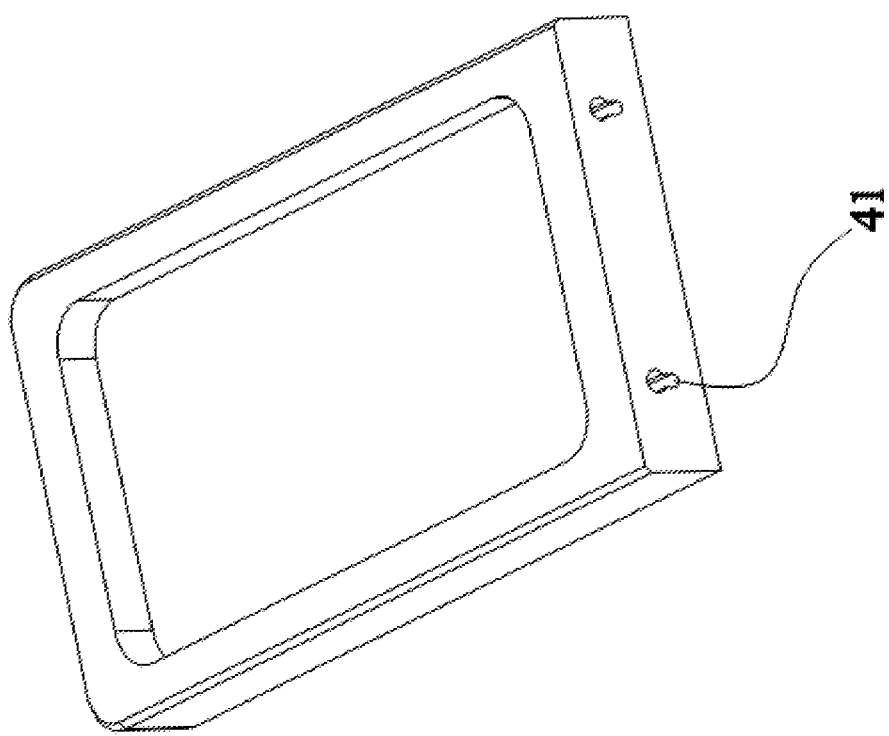
FIG. 9 is a perspective view of an accommodating case of the invention.

Referring to FIGS. 8 and 9, when the computing device 17 is a smart phone, the connecting member can be an accommodating case 40 comprising a recess accommodating the computing device 17 and a third securing unit 41 disposed on an outer surface of the accommodating case 40. The shape of the recess corresponds to the outer profile of the computing device 17 so that the computing device 17 is held or accommodated in the recess. The third securing unit 41 is adapted to couple with or connected to the connecting unit 13 of the light sensing device 10. The coupling or connection is preferably performed by an engagement structure, but is not limited thereto.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

What is claimed is:

1. A miniature light sensing assembly, comprising:
  a light sensing device comprising:
    a main body having an entrance;
    a light detecting unit disposed in the main body and receiving light travelling through the entrance;
    a processing module disposed in the main body and converting the light into a photoelectric signal;
    a connecting unit disposed on the main body; and
    a signal transmitting module transmitting the photoelectric signal by pixel wirelessly;
  a computing device; and
  a connecting member adapted to couple with the light sensing device through the connecting unit, wherein the connecting member is a portable seat comprising a seat main body having a top surface and a bottom surface, a first securing unit disposed on the top surface and a rotatable unit disposed on the bottom surface, wherein by connection of the first securing unit to the connecting unit, the portable seat is joined to the light sensing device, and the rotatable unit may be rotated by an appropriate angle for firm standing of the light sensing device on a flat surface; or the connecting member is an adjustable holder comprising a holder main body having a reverse U-shaped cross section and a second securing unit disposed on a top side of the adjustable holder, wherein the holder main body has a first inner wall and a second inner wall with the distance therebetween being equal to or slightly smaller than the thickness of the computing device so that the adjustable holder with the light sensing device joined thereto through the second securing unit may be clamped on the computing device;
  wherein the computing device is configured to, upon execution of machine readable instructions: sending an instruction on exposure time to the light sensing device, receiving the photoelectric signal by pixel transmitted by the signal transmitting module, converting the photoelectric signal by pixel into an electric signal by wavelength, calculating spectrum-related or photometric-related information based on the electric signal by wavelength, and displaying the spectrum-related or photometric-related information.

2. The miniature light sensing assembly of claim 1, wherein the spectrum-related or photometric-related information is light color-associated information.

3. The miniature light sensing assembly of claim 2, wherein the light color-associated information is selected from the group consisting of color coordinate, color temperature and color rendering.

4. The miniature light sensing assembly of claim 1, wherein the computing device is one or more selected from the group consisting of a desktop computer, a non-portable computer, a laptop computer, a smart phone, smart glasses, a smart wrist strap device, and a tablet computer.

5. The miniature light sensing assembly of claim 1, wherein the connecting member is one of a portable seat, an adjustable holder or an accommodating case.

6. The miniature light sensing assembly of claim 1, wherein the computing device is a laptop or desktop computer, and the connecting member is the portable seat.

7. The miniature light sensing assembly of claim 6, wherein the rotatable unit is joined to the seat main body by a bolt and a shaft with respect to which the rotatable unit rotates, and a spring is disposed between the bolt and the shaft to bias the rotatable unit so that the rotatable unit is tightly joined to the main body.

8. The miniature light sensing assembly of claim 6, wherein the computing device is a tablet or a smart phone.

9. The miniature light sensing assembly of claim 1, wherein the computing device is a tablet or a smart phone, and the connecting member is the adjustable holder.

10. The miniature light sensing assembly of claim 9, wherein a plurality of soft pads are disposed on the first inner wall and the second inner wall, with the distance between the soft pads on the first inner wall and the second inner wall is equal to or smaller than the thickness of the computing device so that the adjustable holder may be clamped on the computing device.

11. The miniature light sensing assembly of claim 9, wherein the first inner wall is longer than the second inner wall, and the adjustable holder may be clamped on the computing device with the second inner wall facing the display side of the same.

12. The miniature light sensing assembly of claim 1, wherein the computing device is a smart phone and the connecting member is an accommodating case having a recess accommodating the computing device and a third securing unit disposed on an outer surface of the accommodating case through which the light sensing device may be joined to, wherein the recess has a shape corresponding to the shape of the computing device for accommodating the same.

* * * * *